United States Patent [19]

Huppee

[11] Patent Number: 4,603,890

[45] Date of Patent: Aug. 5, 1986

[54] BARBED TUBING CONNECTOR

[76] Inventor: Robert Huppee, 1910 Thierry, Brossard, Quebec, Canada, J4W 2M8

[21] Appl. No.: 679,001

[22] Filed: Dec. 6, 1984

[51] Int. Cl.⁴ .............................................. F16L 33/00
[52] U.S. Cl. .................................... 285/239; 285/259; 285/242; 285/252; 285/347; 285/14
[58] Field of Search ............... 285/239, 259, 242, 252, 285/347, 13, 14

[56] References Cited

U.S. PATENT DOCUMENTS

| | | | |
|---|---|---|---|
| 2,314,236 | 3/1943 | Mott | 285/259 X |
| 2,805,088 | 9/1957 | Cline et al. | |
| 3,118,692 | 1/1964 | Fitzhugh | |
| 3,174,777 | 3/1965 | Lodholm et al. | 285/259 X |
| 3,210,100 | 10/1965 | Lowles et al. | |
| 3,578,360 | 5/1971 | Eliot | 285/55 |
| 3,653,691 | 4/1972 | Henson | |
| 3,711,130 | 1/1973 | Betzler | |
| 3,759,445 | 9/1973 | King | 285/239 X |
| 3,907,342 | 9/1975 | Dudek | |
| 3,966,238 | 6/1976 | Washkewicz et al. | |
| 4,317,471 | 3/1982 | King | 285/323 X |

FOREIGN PATENT DOCUMENTS 3021346 12/1981 Fed. Rep. of Germany ...... 285/239

Primary Examiner—Richard J. Scanlan, Jr.

[57] ABSTRACT

A connector sealingly engageable within the end of a flexible tubing or hose carrying a pressurized fluid. The connector is a rigid tubular body having peripheral gripping barbs. The outer, tapered end of the connector is fitted with an O-ring sealing the tubing over the connector. The end portion of the tubing surrounding the barbs is preferably vented to the outside.

8 Claims, 8 Drawing Figures

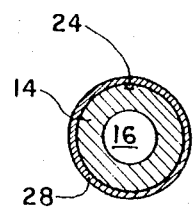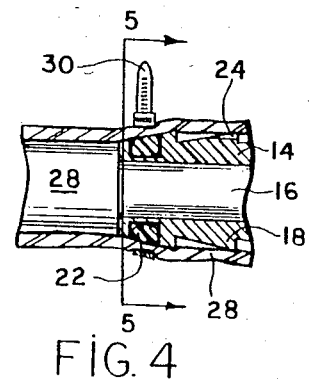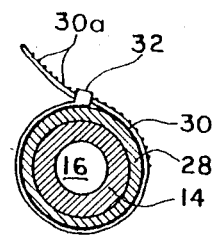
FIG. 3　　　　FIG. 4　　　　FIG. 5
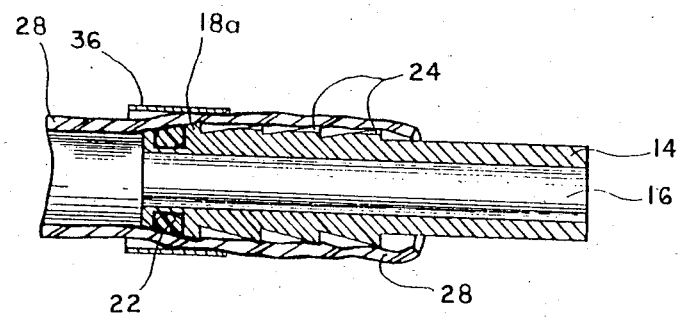
FIG. 6
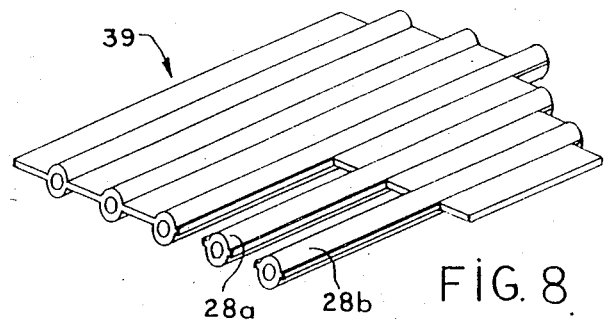
FIG. 8

BARBED TUBING CONNECTOR

FIELD OF THE INVENTION

This invention relates to joints and, most specifically, to a barbed tubing connector on which a tubing ca be manually installed.

BACKGROUND OF THE INVENTION

Prior art discloses a number of patents on barbed connectors for hose or similar flexible and somewhat elastic tubing. However, pressurized fluid tubing joints still remain a troublesome area for users. The barbs which form the pull-out resistance means of the connection in all previous patents have the additional purpose of constituting also the sealing means. The sealing efficiency of these connectors and also their pull-out resistance rapidly decreases with a slight increase in fluid pressure. Generally, leaking starts at a medium fluid pressure and increases rapidly with a slight build-up of the pressure because the tubing expands around the successive barbs. For example, U.S. Pat. No. 3,210,100, issued Oct. 5, 1965 to Lowles et al, and U.S. Pat. No. 3,907,342, issued Sept. 23, 1975, to Dudek, disclose various shapes and arrangements of the barbs but these barbs are used both as gripping means to retain the tubing on the connector and as sealing means to ensure a leak free connection. To allow higher operating pressures up to the bursting pressure of the tube, and still ensure a leak free connection, the use of relatively expensive clamps are required. These clamps also usually require specialized tools for application on the connectors. However, when such a connector is used with webbed multiple tubing, it has been found that leakage can develop under even relatively low fluid pressure, and that the use of clamps is largely unsuccessfull in preventing such leakage.

OBJECTS OF THE INVENTION

The main object of the invention is to provide a barbed connector with a sealing member capable of making a good seal up to bursting pressure of the tubing, without the use of clamps, with some types of tubing such as polyethylene or webbed multiple tubing made of Ethyl Vinyl Acetate (EVA), and with the use of simple and inexpensive expansion restraining means, as described hereafter, for other types of tubing such as vinyl and reinforced vinyl tubing.

Another object of the invention is to provide the above connector with venting means for the barbs whereby the gripping barbs are used solely as a pull-out resistance means.

SUMMARY OF THE INVENTION

The tubing connector of the invention includes a plurality of spaced-apart frustro-conical barbs used as gripping means for a flexible and somewhat elastic hose and an O-ring within a groove in the endmost barb for sealingly engaging the connector to the tubing. Venting means are preferably provided for the portion of the tubing surrounding the barbs. A tensioning strap or a thin sleeve may surround the tubing in registry with the O-ring.

In one embodiment of the venting means, a passage is formed across each barb and the passage communicates with the exterior. In an other embodiment, the hose itself is perforated downstream from the O-ring.

DESCRIPTION OF THE DRAWINGS

FIG. 3 is a cross-sectional view the connector taken along line 3—3 of FIG. 2;

FIG. 4 is a partial view of FIG. 2 wherein a tensioning strap surrounds the tubing in registry with the O-ring;

FIG. 5 is a cross-sectional view taken along line 5—5 of FIG. 4;

FIG. 6 is a view similar to that of FIG. 2 wherein a friction fit sleeve surrounds the tubing in registry with the O-ring;

FIG. 8 is a perspective view of a webbed multiple tubing.

DETAILED DESCRIPTION OF THE DRAWINGS

Figure 1:
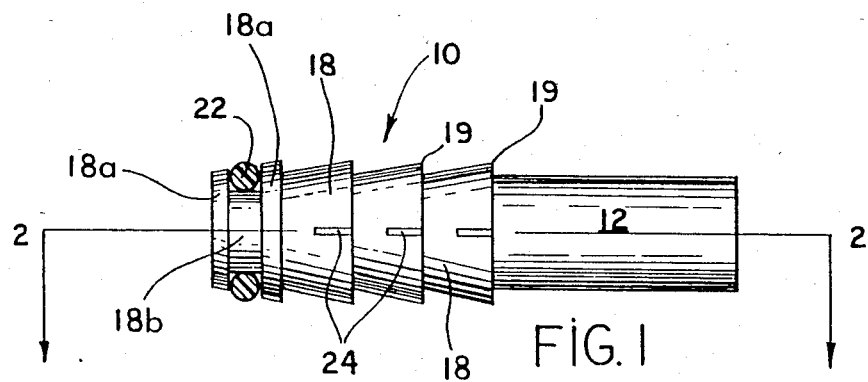
FIG. 1 is a plan view of the first embodiment of the invention.
Figure 2:
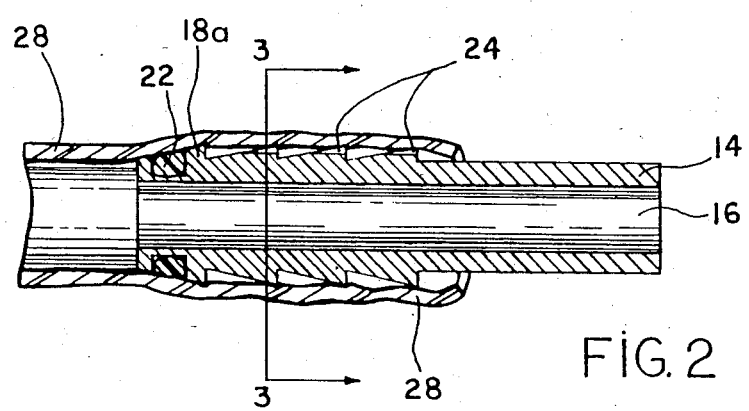
FIG. 2 is a longitudinal sectional view of the tubing connector taken axially along the notches of the barbs as defined by the line 2—2 of FIG. 1, and further surrounded by the flexible and somewhat elastic end of a tubing.

As shown in FIGS. 1, 2, 3, 4, and 6 of the drawings, the first embodiment of the invention shows a hose connector 10 consisting of a tubular body 12 of metal or the like rigid material and defining a thick peripheral wall 14 and a central lumen 16. Wall 14 includes a number of spaced-apart radially protruding frustro-conical ribs or barbs 18.

The barbs 18 flare away from the endmost barb 18a and each has a sharp outer edge 19. Endmost barb 18a has a peripheral groove 18b in which is engaged a flexible and elastic sealing O-ring 22. The O-ring 22 protrudes radially of the external tapered surface of the endmost barb 18a.

In the first embodiment, each barb 18, except the endmost barb 18a, has a slot 24 made across its edge 19. Preferably, slots 24 are in longitudinal alignment along the connector.

The tubing connector 10 is designed to be manually engaged within the free end portion of a flexible, elastic tubing 28 but to resist withdrawal therefrom because of the sharp edges 19 of barbs 18. O-ring 22 is compressed by tubing 28 and will maintain a sealing fit even if tubing 28 expands around O-ring 22 under fluid pressure.

Some leakage may initially occur in between the O-ring 22 and tubing 28 before O-ring 22 becomes properly seated. Without slots 24, the fluid under pressure would then have gathered in the empty spaces between the barbs 18 forming a pressure build-up which would have expanded the tubing wall over those barbs 18. A temporary reduction in the pull-out resistance of the joint would thus result. The barb slots 24 therefore constitute a venting means to the atmosphere which prevent fluid pressure build-up between the tubing 28 and the connector wall 14. It is to be understood that the main characteristic of the invention resides in that sealing of the connector 10 to the tubing 28 is obtained by the O-ring 22 which can accomodate irregularities in the roundness of the tubing wall and a certain diametrical expansion thereof without leaking. Consequently, except for the endmost barb 18a, and its O-ring 22 remaining barbs 18 only need to be efficient gripping devices, with no requirement whatsoever for sealing.

The slots 24, do in fact, appear to increase the grip between the tubing 28 and the connector 10.

As shown in FIGS. 4 and 5 of the drawings, the tubing 28 may be further adjustedly surrounded by a strap 30 in registry with O-ring 22. Strap 30 may include a plurality of stop ribs 30a selectively lockingly engageable in a locking sleeve 32 integrally formed at the inner end of the strap 30. Strap 30 need not be tensionned more than necessary to prevent undue expansion of the tubing 28 under pressure. Tensioning strap 30 is normally used in association with a tubing 28 which has higher degree of elasticity.

FIG. 6 shows that tubing 28 may also be adjustedly surrounded by a plain thin sleeve 36 centrally registered with O-ring 22. Sleeve 36 need only be friction slipped into place by hand, requiring no more force than is necessary to prevent it from slipping away by itself. Sleeve 36 does not require any tool for effective placement.

Figure 7:
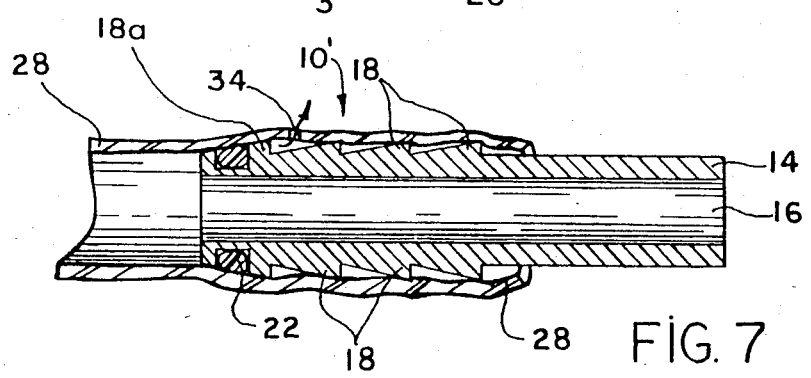
FIG. 7 is a view similar to that of FIG. 2 but relating to a second embodiment of the venting means.

FIG. 7 shows a second embodiment of the invention. The connector 10' is identical to that of the first embodiment except for the following:

(1) no barb slot 24 is present;

(2) a bore is pierced through the tubing 28 at 34 in registry with the space formed between the endmost barb 18a and the adjacent barb 18. Aganin, any pressurized fluid which might have escaped past O-ring 22 when the latter was still not properly seated is vented to the atmosphere directly through the wall of tubing 28.

FIG. 8 shows a perspective view of a piece of webbed multiple tubing. Comparative tests on webbed multiple tubing as shown in FIG. 8, where tubing 28a and 28b have been trimmed of their web for manual installation over tubing connectors, have shown that with the same type of tubing and using two identical connectors, but one modified as just described, the non-modified connector leaked at about 35 psig and the modified connector did not leak up to 250 psig at which pressure a blister formed in the tubing and expanded to bursting point. The above tests were carried out without the use of clamps or any restraining devices whatsoever.

Other tests carried out on reinforced vinyl tubing where simple tube expansion restraining devices such as 36 of FIG. 6, were slid by hand and centered over the O-ring of the modified barb, without any tightening or crimping whatsoever, have shown that the modified connector did not leak up to bursting pressure which was between 800 and 900 psig.

The connector is suitable to be used with tubing made of any flexible, elastic elastomeric material, for instance, synthetic or natural rubber or any synthetic plastic materials such as, for example, polyethylene, nylon, EVA, or tetrafluoroethylene resin known under the registed trade mark <<TEFLON>> owned by the DuPont Company.

I claim:

1. A tubing connector for sealingly engaging the end portion of a flexible and somewhat elastic tubing adapted to carry a pressurized fluid, said connector comprising a rigid tubular body having a free end for insertion into said tubing, an endmost barb at said free end and additional longitudinally spaced-apart frusto-conical barbs protruding from the outer surface of said body, all of said barbs being concentric and flaring away from said body free end, the frusto-conical surface of said endmost barb having a peripheral groove and an O-ring engaging said groove and protruding outwardly from said frusto-conical surface, said barbs adapted to be inserted into and expand said tubing end portion, said O-ring then sealing said tubing over said connector and preventing fluid pressure build-up in the portion of said tubing surrounding said barbs, whereby said barbs can resist pull-out of the tubing from said connector, and further including fluid pressure venting means for further preventing fluid pressure build-up in the portion of the tubing surrounding said barbs.

2. The tubing connector of claim 1, wherein said venting means is a fluid escaping passage made through said barbs.

3. The tubing connector as defined in claim 2, wherein said passage is formed by a longitudinal notch made at the periphery of each barb.

4. The tubing connector as defined in claim 1, combined with said tubing when said tubing is fitted over said connector.

5. The combination of claim 4, wherein said venting means is a bore made through said tubing downstream from said O-ring.

6. The combination of claim 4, further including a tension strap tensioned around said tubing in registry with said O-ring.

7. The combination of claim 4, further including a friction fit sleeve slipped around said tubing in registry with said O-ring.

8. A tubing connector for sealingly engaging the end portion of a flexible and somewhat elastic tubing adapted to carry a pressurized fluid, said connector comprising a rigid tubular body having a free end for insertion into said tubing, an endmost barb at said free end and additional, longitudinally spaced apart frusto-conical barbs protruding from the outer surface of said body, all of said barbs being concentric and flaring away from said body free end, the frusto-conical surface of said endmost barb having a peripheral groove and an O-ring engaging said groove and protruding outwardly from said frusto-conical surface, said barbs adapted to be inserted into and expand said tubing end portion, said O-ring then sealing said tubing over said connector and preventing fluid pressure build-up in the portion of said tubing surrounding said barbs, whereby said barbs can resist pull-out of the tubing from said connector.

* * * * *